(12) United States Patent
Palm et al.

(10) Patent No.: US 8,868,699 B2
(45) Date of Patent: *Oct. 21, 2014

(54) MINIMUM INTERVENTION AUTHENTICATION OF HETEROGENEOUS NETWORK TECHNOLOGIES (MIAHNT)

(71) Applicant: Broadcom Corporation, Irvine, CA (US)

(72) Inventors: Stephen R. Palm, Irvine, CA (US); Henry Ptasinski, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,256

(22) Filed: Jun. 18, 2013

(65) Prior Publication Data

US 2013/0282883 A1    Oct. 24, 2013

Related U.S. Application Data (63) Continuation of application No. 11/348,624, filed on Jan. 23, 2006, now Pat. No. 8,468,219.

(60) Provisional application No. 60/649,404, filed on Feb. 1, 2005.

(51) Int. Cl.
| | | |
|---|---|---|
| *G06F 15/177* | (2006.01) | |
| *H04L 12/24* | (2006.01) | |
| *H04L 29/06* | (2006.01) | |

(52) U.S. Cl.
CPC .......... *H04L 41/0806* (2013.01); *H04L 63/20* (2013.01)
USPC .............................. 709/220; 709/219; 726/17

(58) Field of Classification Search
USPC .................................. 709/219, 220; 726/17
See application file for complete search history.

(56) References Cited

U.S. PATENT DOCUMENTS

| | | | | |
|---|---|---|---|---|
| 5,657,221 | A  * | 8/1997  | Warman et al. ................. | 700/83 |
| 6,012,100 | A  * | 1/2000  | Frailong et al. ............... | 709/250 |
| 6,349,352 | B1 * | 2/2002  | Lea ................................. | 710/72 |
| 6,570,869 | B1 * | 5/2003  | Shankar et al. ............... | 370/352 |
| 6,587,739 | B1 * | 7/2003  | Abrams et al. .................. | 700/83 |
| 6,748,544 | B1 * | 6/2004  | Challener et al. .............. | 726/17 |
| 6,801,507 | B1 * | 10/2004 | Humpleman et al. ........ | 370/257 |
| 6,961,777 | B1 * | 11/2005 | Hariharasubrahmanian . | 709/230 |
| 6,978,385 | B1 * | 12/2005 | Cheston et al. ................. | 726/18 |
| 7,194,689 | B2 * | 3/2007  | Manni et al. ................... | 715/735 |
| 7,260,608 | B2 * | 8/2007  | Kuki ............................. | 709/206 |
| 7,315,886 | B1 * | 1/2008  | Meenan et al. ............... | 709/219 |

(Continued)

*Primary Examiner* — Thomas Dailey (74) *Attorney, Agent, or Firm* — Garlick & Markison; Bruce E. Garlick (57) ABSTRACT

Methods and systems for enabling communication of information within a network are disclosed herein and comprise receiving at a first communication device located within a network, configuration information from a network service provider for configuring a plurality of communication devices located within said network. The first communication device located within the network can be configured based on at least a portion of the received configuration information. In response to a user input at a second communication device located within the network, at least a portion of the received configuration information can be communicated from the first communication device to the second communication device located within the network. The network service provider can be coupled to the first communication device via a wired connection. The network can comprise a wireless network.

20 Claims, 5 Drawing Sheets

(56) References Cited

U.S. PATENT DOCUMENTS

| | | | |
|---|---|---|---|
| 2002/0060750 A1* | 5/2002 | Istvan et al. | 348/569 |
| 2003/0171113 A1* | 9/2003 | Choi | 455/420 |
| 2005/0038526 A1* | 2/2005 | Choi | 700/1 |
| 2005/0050318 A1* | 3/2005 | Alone et al. | 713/155 |
| 2005/0257039 A1* | 11/2005 | Marshall | 713/1 |

* cited by examiner

MINIMUM INTERVENTION AUTHENTICATION OF HETEROGENEOUS NETWORK TECHNOLOGIES (MIAHNT)

CROSS-REFERENCE TO RELATED APPLICATIONS/INCORPORATION BY REFERENCE

The present U.S. Utility Patent Application claims priority pursuant to 35 U.S.C. §120, as a continuation of U.S. Utility patent application Ser. No. 11/348,624, filed on Jan. 23, 2006, issuing as U.S. Pat. No. 8,468,219, which is incorporated herein by reference in its entirety for all purposes.

The Ser. No. 11/348,624 application claims priority under 35 U.S.C. §119(e) to U.S. Provisional Patent Application No. 60/649,404, filed on Feb. 1, 2005, which is incorporated herein by reference in its entirety for all purposes.

FIELD OF THE INVENTION

Certain embodiments of the invention relate to management of communication networks. More specifically, certain embodiments of the invention relate to a method and system for minimum intervention authentication of heterogeneous network technologies (MIAHNT).

BACKGROUND OF THE INVENTION

There is an increasing interest in home networking to enable users to enjoy the ubiquitous availability of digital content that a wired and wireless home network connection provides. Many forms of data are exchanged over current communications network including, for example, voice, financial and business information, digital content, and email, to name a few. Much of the information exchanged is of a private nature, and it is desirable to protect such information from eavesdropping, alteration, and/or other forms of invasive activities. To provide such protection, many current wireless networking technologies incorporate security functionalities. Enabling the security functionalities typically involves the provisioning of parameters related to the operation and security of the network. Normally, these parameters are programmed by a manager of the network. In the case of wireless networking equipment for use in the consumer market, the programming of such parameters may be sufficiently intimidating and confusing for a user to cause the manager of residential wireless networking equipment to be reluctant to perform the tasks involved in properly securing the network.

Similarly, many of the "no new wires" wired home network technologies, such as phone-line networking (e.g. Home-PNA), power-line networking (e.g. HomePlug), coaxial networking (e.g. MoCA), etc., have a similar characteristic as wireless technologies in that transmission could be monitored by neighboring systems since those wires often connect, either directly or indirectly, neighboring homes together. Thus, as in the case of wireless networking equipment for use in the consumer market, the programming of such parameters can be confusing for a user to cause the manager of residential wired networking equipment to be reluctant to perform the tasks involved in properly securing the network. Finally, such wired and wireless networking systems can be inter-connected, which creates additional difficulties in securing the networking systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for minimum intervention authentication of heterogeneous network technologies (MIAHNT), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Aspects of the present invention relate to the configuration of communication networks and, more specifically, to the local and remote configuration of security parameters for portions of a heterogeneous network that may include both wired and wireless communication segments. Although the following description makes reference to particular communication network technologies and network entities, the present invention cannot be so limited and other network technologies supporting a different arrangement of network entities can be employed without departing from the spirit and scope of the invention. In addition, the following description makes reference to "devices" and "functions". A device performing a given function "x" as part of its operation can be referred to as an "x" device, or as an "x" function, interchangeably, without departing from the spirit or scope of the present invention.

In accordance with an example of an implementation of the invention, one or more network devices within a heterogeneous network can be authenticated remotely by a service provider and/or via the use of a network relay device within the heterogeneous network. In this regard, configuration information for a plurality of devices in a network can be received by a gateway device in the network via a network service provider. The gateway device can be configured remotely, based on the received configuration information. In response to an input to a second network device in the network, a portion of the received configuration information can be communicated from the gateway device to the second network device in the network. The second network device can then be configured based on the communicated portion of the received configuration information.

Figure 1:
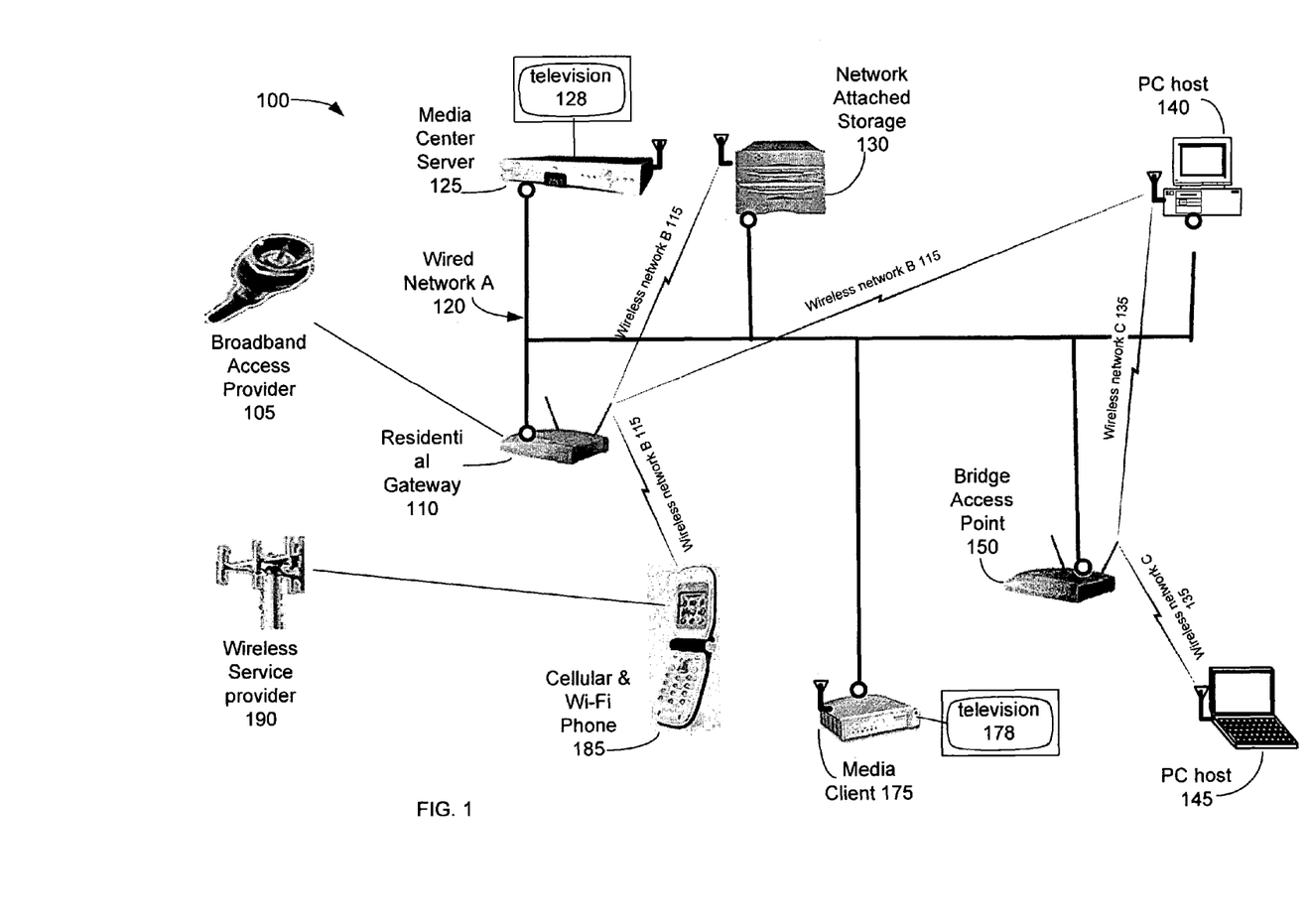
FIG. 1 shows an example of an implementation of a network architecture.

FIG. 1 illustrates an example of an implementation of the invention in a network architecture. Referring to FIG. 1, the communication network 100 includes a broadband access provider (BAP) 105, a residential gateway 110, a media center server 125 with television 128, a network attached storage (NAS) 130, a personal computer (PC) host 140, a bridge access point 150, a media client 175 with television 178, a PC host 145, a cellular and Wi-Fi phone 185, and a wireless service provider 190. The residential gateway 110 can be communicatively coupled via, for example, an internal or external modem to the BAP 105. The BAP 105 can be, for example, an Internet service provider. Although referred to as a residential gateway, the gateway 110 can, in fact, be located in any premise requiring broadband access including, for example, residential and business settings.

A wired network A 120 communicatively couples the residential gateway 110, the media center server 125, the NAS 130, the media client 175, the bridge access point 150, and the PC host 140. The residential gateway 110 can also communicate wirelessly with the NAS 130, the PC host 140, and the cellular and Wi-Fi phone 185 via the wireless network B 115. The PC host 140 and the PC host 145 are also in wireless communication with the residential gateway 110 via the wired network 120, the bridge access point 150, and the wireless network C 135. The BAP 105 can include, for example, a cable network, a digital subscriber line (DSL) network, a satellite network, a T1 or T3 synchronous digital network, or any of a variety of other network technologies. The residential gateway 110 can provide wired or wireless access to the communication bandwidth of the BAP 105 via the wired network A 120, the wireless network B 115, and the wireless network C 150. The wired network A 120 can include, for example, an Ethernet (e.g. IEEE 802.3) network, a powerline (e.g. HomePlug) Network, a phoneline (e.g. HomePNA) network, a HomePNA over Coax network, a Multimedia over Coax (MoCA) network, an 802.11 over coax network, or any wired network based upon any of a variety of other communication technologies. The wireless networks B 115 and C 135 can include, for example, Institute of Electrical and Electronics Engineers (IEEE) 802.11 networks such as IEEE 802.11a/b/g/n, an 802.15 network, an 802.16 network, a Bluetooth network, or any wireless network based upon a variety of other wireless networking standards.

In one example of an implementation of the invention, the residential gateway 110 can enable the remote setup, provisioning, or configuration of security parameters used by the residential gateway 110 and/or any of the other network entities coupled in a wired fashion via the wired network A 120, and wirelessly via the wireless network B 115 and the wireless network C 135 to the residential gateway 110. Such setup, configuration, or provisioning can be performed by an operator of the broadband network 105, for example, or by an authenticated and authorized third party having access to the residential gateway 110 via the broadband network 105.

The residential gateway 110 can be adapted to support the remote configuration of residential gateway 110 network security and/or operation-related parameters via a broadband access provider such as, for example, the BAP 105. Network security and/or operation-related parameters can include, for example, passwords, authentication keys, pass phrases, and/or security or network communication modes that have traditionally been configurable via a graphical user interface on a device on a network, such as, for example, the wired network A 120. In another example of an implementation of the invention, a broadband access gateway, such as the gateway device 110, can permit the configuration of the network security related-parameters of other network entities of the communication network 100 such as, for example, the NAS 130, the PC host 140, and/or the cellular and Wi-Fi phone 185, via a wired or wireless network such as, for example, the wireless network B 115. In this regard, the remote configuration of the residential gateway 110 can be enabled utilizing messaging received via the BAP 105. Furthermore, the remote configuration of other network entities communicatively coupled to the residential gateway 110 can also be enabled utilizing the messaging received via the BAP 105. A broadband access gateway such as, for example, the residential gateway 110 can be enabled to accept remote configuration information during a predefined time period relative to the powering up of the residential gateway 110, or following a user action at the residential gateway 110.

The messaging received via a broadband access provider, such as the BAP 105, can place the residential gateway 110 into a mode that permits the configuration of operational parameters such as those described above. In addition, the messaging interface of the residential interface 110 as presented to the BAP 105, can permit a remote operator communicating with the residential gateway 110 via the BAP 105 to cause the communication of operational parameters to other network entities of communication network 100, via one of the wired or wireless interfaces such as, for example, the wired network A 120 and wireless network B 115. The residential gateway 110 can employ aspects of a method of network configuration that permits secure provisioning via a wireless interface of wireless network parameters. Such a method can, for example, utilize the Diffie-Hellman key agreement protocol that allows two entities to exchange secret information over an insecure medium without the use of prior secrets.

In another example of an implementation of the invention, a broadband access gateway such as, for example, the residential gateway 110 of FIG. 1 can be remotely configured with security and/or other operational parameters, and can then be caused to enter a mode in which it engages other network entities via a network such as, for example, the wireless network B 115, in configuration of those other entities for network operation. The configuration of a broadband access gateway such as, for example, the residential gateway 110 of FIG. 1 by a remote operator can employ a message protocol such as, for example, SOAP using the extensible markup language (XML) or simple network management protocol (SNMP) in configuring the residential gateway 110.

Figure 2A:
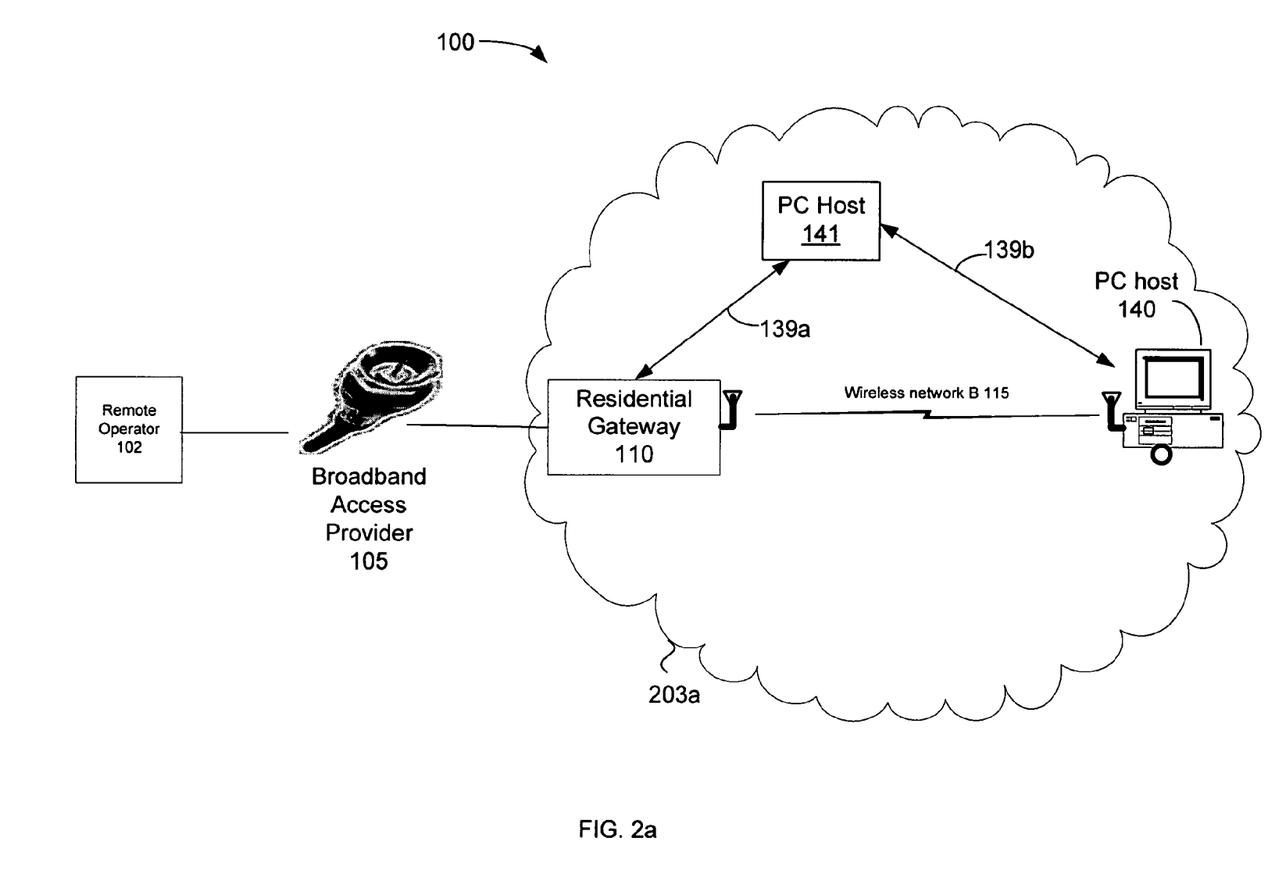
FIG. 2a shows an example of an implementation of a communication network that corresponds to a portion of the communication network of FIG. 1, for example, in which remote configuration of a residential gateway and a PC host may be performed.

FIG. 2a illustrates an example of an implementation of a communication network that can correspond to a portion of the communication network of FIG. 1, for example, in which remote configuration of a residential gateway and a PC host can be performed, in accordance with an example of an implementation of the invention. The communication network 100 of FIG. 2a includes a residential gateway 110, PC host 141, and PC host 140 that can correspond to, for example, the residential gateway 110 and the PC host 140 of FIG. 1. The residential gateway 110 can engage in communication with a remote operator 102 via a broadband access provider (BAP) 105. The BAP 105 can include, for example, a cable network, a DSL network, a satellite network, or other form of communication network infrastructure. In addition, the residential gateway 110 is in wireless communication with the PC host 140 via the wireless network B 115. The residential gateway device 110 and the PC host 140 can form a network 203a, which can be a wireless network.

In one example of an implementation of the present invention, a broadband access gateway such as, for example, the residential gateway 110 of FIG. 2a can be remotely configured by the remote operator 102 with security and/or operational parameters, for example, via the BAP 105, as described above. Another network entity in communication with the residential gateway 110 such as, for example, the PC host 140 of FIG. 2a can then be placed in a mode to engage in configuration for network operation. Placement of the PC host 140 in the configuration mode can result from a user action such as, for example, applying power to the PC host 140, activating a soft or hard button on the PC host 140, or activating a configuration utility/wizard on the PC host 140. A user at the location of the PC host 140 can then manually provide to the PC host 140, security and/or operational parameters matching those used by the remote operator 102 during remote configuration of the residential gateway 110. The residential gateway 110 and the host PC 140, having received identical security and/or operational parameters are thereby configured for exchange of information between the BAP 105 and the PC host 140. The security and/or configuration parameters provided to the PC host 140 by the user can be exchanged, for example, via a conventional voice call between the user and the remote operator 102. The remote operator 102 can be, for example, a customer service representative engaged in configuring the residential gateway 110 and any other customer network entities.

In an example of an implementation of the invention, after the residential gateway 110 of FIG. 2a is configured with security and/or operational parameters by the remote operator 102, via the BAP 105, the residential gateway 110 can be remotely placed in a mode for configuration of other network entities such as, for example, the PC host 140 and/or the PC host 141. The PC host 141 may be connected to the residential gateway 110 via connection 139a, and to the PC host 140 via connection 139b. Connections 139a and 139b may be wired or wireless connections. In such a mode, the residential gateway 110 can, for example, be enabled to engage in configuration activities with other network entities via a wired or wireless network such as, for example, the wireless network B 115, for a predetermined period of time. As described above, the remote configuration of the residential gateway 110 and the activation of any additional operating modes of the residential gateway 110 can be accomplished using a communication protocol such as, for example, SOAP using XML or SNMP.

In this regard, a user at the location of a network entity in communication with the residential gateway 110 such as, for example, the PC host 140 can activate a configuration mode of the PC host 140 by, for example, activating a soft or hard button on the PC host 140, or power up the PC host 140. The residential gateway 110 and PC host 140 can then exchange security and/or operational parameters, for example, without further user intervention, using a secure method of parameter exchange such as the Secure Easy Setup referenced above. The residential gateway 110 and the host PC 140 are thereby configured for exchange of information between the BAP 105 and the PC host 140. After the exchange of information, the residential gateway 110 and the host PC 140 may have corresponding security and/or operational parameters. Furthermore, the PC host 141 may receive configuration information from the residential gateway 110 at the time the soft or hard button is activated on the PC host 140. In this regard, the PC host 141 may be configured by the residential gateway 110 around the time the PC host 140 is configured or at a different time and yet have corresponding security and/or operational parameters.

In an example of an implementation of the invention, the residential gateway 110 located within the network 203a may receive configuration information from the remote operator 102 for configuring a plurality of communication devices located within the network 203a. The residential gateway 110 may be configured based on at least a portion of the received configuration information. The residential gateway 110 may communicate at least a portion of the received configuration information to the PC host 140 located within the network 203a, in response to a user input at the PC host 140. The residential gateway 110 may communicate at least a portion of the received configuration information to the PC host 140 via a wired connection and/or a wireless connection. The residential gateway 110 may communicate the at least a portion of the received configuration information to the PC host 141 within the network 203a. The residential gateway 110 and the PC host 141 may be coupled via a wireless connection and/or a wired connection. The PC host 141 may communicate the at least a portion of the received configuration information to the PC host 140 within the network 203a. The communication from the PC host 141 to the PC host 140 may be in response to the input to the PC host 140. The PC host 141 may be coupled to the PC host 140 via a wired connection and/or a wireless connection. The input to the PC host 140 may include a hardware button input and/or a software button input.

Figure 2B:
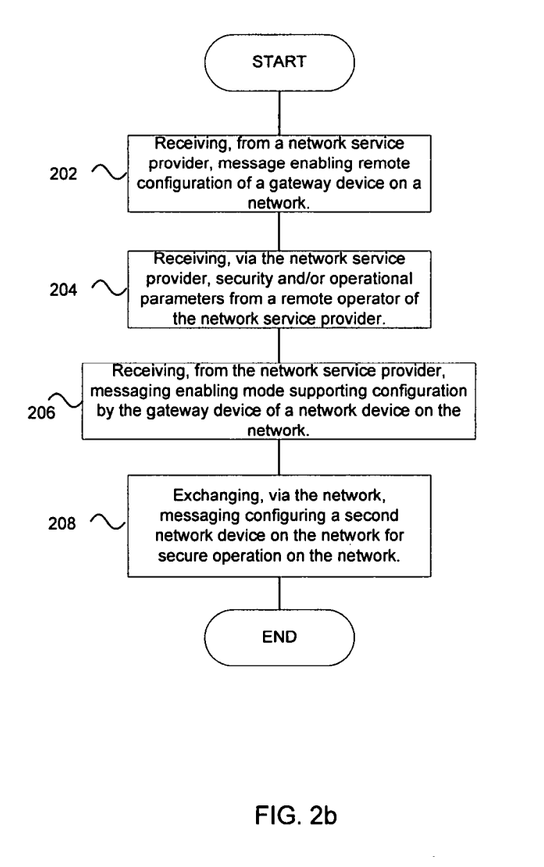
FIG. 2b is a flow diagram illustrating an example of an implementation of steps for remotely configuring authentication of communication in a heterogeneous network.

FIG. 2b is a flow diagram illustrating an example of an implementation of steps for remotely configuring authentication of communication in a heterogeneous network, in accordance with an example of an implementation of the invention. Referring to FIGS. 2a and 2b, at 202, a message can be received by the residential gateway device 110 from the BAP 105. The received message can enable remote configuration of the gateway device 110 on the network 203a. At 204, security and/or operational parameters can be received by the residential gateway device 110 from the BAP 105 with input from the remote operator 102. At 206, additional messages can be received by the gateway device 110. The additional messages can enable a mode of the gateway device 110 supporting configuration by the residential gateway device 110 of a network device, such as the PC host 140, on the network 203a. At 208, messaging can be exchanged between the residential gateway device 110 and the PC host 140 within the network 203a. The exchanged messaging can be utilized for configuring the PC host 140 for secure operation on the network 203a.

Figure 3:
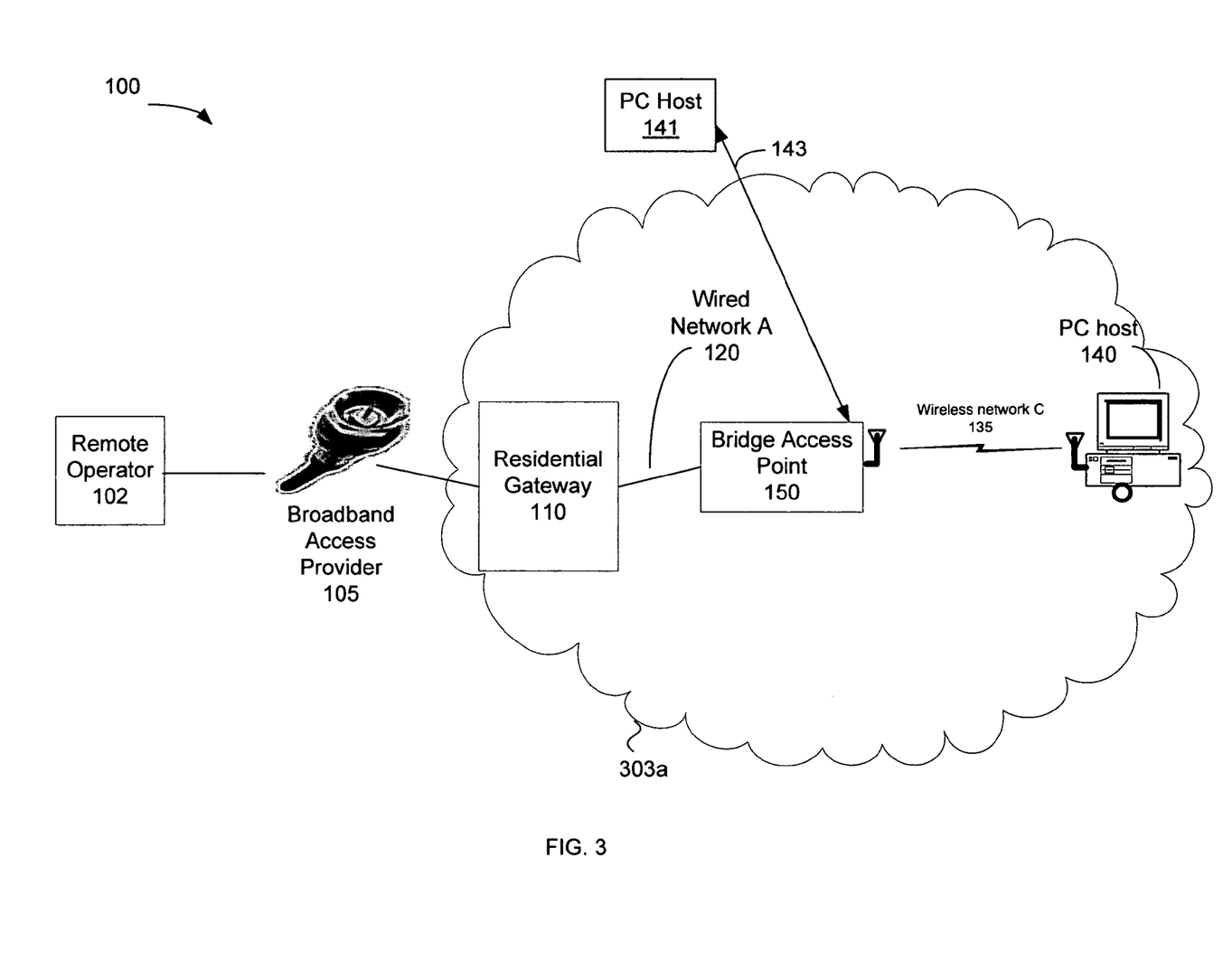
FIG. 3 illustrates an example of an implementation of a communication network that corresponds to a portion of the communication network of FIG. 1, for example, in which remote configuration of a residential gateway and a PC host may be performed.

FIG. 3 illustrates an example of an implementation of a communication network that can correspond to a portion of the communication network of FIG. 1, for example, in which remote configuration of a residential gateway and a PC host can be performed, in accordance with an example of an implementation of the invention. Referring to FIG. 3, the communication network 100 includes a residential gateway 110 and a PC host 140 that can correspond to, for example, the residential gateway 110 and the PC host 140 of FIG. 1. The communication network 100 of FIG. 3 also includes a bridge access point 150 that communicates with the residential gateway 110 via a wired network A 120. The bridge access point 150 also communicates with the PC host 140 via a wireless network C 135. The wired network A 120, the PC host 140, the bridge access point 150, and the wireless network C 135 of FIG. 3 can correspond to, for example, the wired network A 120, the PC host 140, the bridge access point 150, and the wireless network C 135 of FIG. 1. The communication network 100 of FIG. 3 may also include a PC host 141 located outside the network 303a. The PC host 141 may be coupled to the bridge access point 150 via a connection 143, which may be a wired or a wireless connection.

The residential gateway 110 of FIG. 3 can engage in communication with a remote operator 102 via a broadband access provider (BAP) 105. The broadband access provider 105 can include, for example, a cable network, a DSL network, a satellite network, or other form of communication network infrastructure. In an example of an implementation of the present invention, the wired network 120 and the wireless network 135 can be swapped. The residential gateway device 110, the bridge access point 150, and the PC host 140 can form a network 303a.

In one example of an implementation of the invention, a broadband access gateway such as, for example, the residential gateway 110 of FIG. 3, can be configured by a remote operator 102 via the BAP 105, as described above with security and/or operational parameters. The residential gateway 110 can be remotely placed in a mode for configuration of other network entities such as, for example, the PC host 140. In such a mode, the residential gateway 110 can, for example, be enabled to engage in configuration activities with other network entities via a wired or wireless network interface for a predetermined period of time. In this regard, the remote configuration of the residential gateway 110 and the activation of any additional operating modes of the residential gateway 110 can be accomplished using a communication protocol such as, for example, SOAP using XML or SNMP.

In another example of an implementation of the invention, an intermediate entity, or a relay device, can exist in the path between a broadband access gateway, such as, for example, the residential gateway 110 and another network entity to be configured, such as, for example, the PC host 140. In the illustration of FIG. 3, the path between the residential gateway 110 and the PC host 140 includes the wired network A 120, the bridge access point 150, and the wireless network C 135. A relay device such as, for example, the bridge access point 150 can be adapted to participate in the exchange of security and/or operational parameters that enable the PC host 140 to communicate via the wireless network C 135. An intermediate or relay device such as, for example, the bridge access point 150 of FIG. 3 can be adapted to recognize communication protocol elements present during the secure exchange of security and/or operational parameters between a broadband access gateway, such as, for example, the residential gateway 110, and a network entity, such as, for example, the PC host 140. For example, in one example of an implementation of the present invention, the residential gateway 110 can send predetermined information elements or messages via the wired network A 120 during the period when the residential gateway 110 is in a mode for network configuration. The bridge access point 150 can recognize such protocol information elements or messages sent by the residential gateway 110 as indicators of the configuration mode of the residential gateway 110. Such recognition can be enabled at all times, or only under certain conditions, such as, for example, following application of power to the bridge access point 150, or activation of a button on the bridge access point 150. Furthermore, such recognition can be also enabled following application of power to the PC host 140, or activation of a button on the PC host 140.

Having recognized the configuration mode of the residential gateway 110, a relay device, such as the bridge access point 150 of FIG. 3, can monitor messaging received from the wireless network C 135 for indications of configuration activity on the part of a network entity, such as the PC host 140. Such configuration activity can be initiated, for example, as described above with respect to FIG. 2a. Upon recognizing the configuration mode of the residential gateway 110 and the configuration activity of the PC host 140, a relay device such as, for example, the bridge access point 150 can then pass messaging received from the residential gateway 110 to the PC host 140. Messaging received from the PC host 140 can be passed to the residential gateway 110, to enable the configuration of the PC host 140 for communication with the residential gateway 110 via the wireless network C 135. The messaging exchanged by the residential gateway 110 and the PC host 140 can then enable the PC host 140 to engage in communication with the other elements of a communication network such as, for example, the network entities of the communication network 100 of FIG. 1.

In another example of an implementation of the present invention, the bridge access point 150 can implement a configuration protocol (CFP) Relay function, as defined below. The residential gateway 110 can implement CFP Configurator functionality, and the PC host 140 can implement CFP Client functionality. Typically, networks that are not IEEE-802.11 compliant do not employ the same beacon and association method as an IEEE 802.11-compliant network. A CFP Configurator can be adapted to broadcast a CFP type-length-value (TLV) indicating an open CFP Window. The CFP TLV can be broadcast using layer-2 broadcast or layer-3 broadcast messaging. The layer-3 broadcast can be performed using a General Event Notification Architecture (GENA) NOTIFY method such as, for example, the GENA Notify method described in the document by J. Cohen, S. Aggarwal, Y. Y. Goland, entitled "General Event Notification Architecture Base: Client to Arbiter", Internet Draft--draft-cohen-gena-client-00.txt. In this regard, the broadcast can be performed using the NTS value CFP Window (CFP:Window) to multicast channel/port or the broadcast address. The value of NT in a CFP:Window request can be set to the service's service type, and the CFP:Window request can also contain a USN header set to the CFP Configurator service's USN.

The CFP:Window requests can contain a Location and/or AL header. If there is no domain name server (DNS) support available on the local network, then at least one location can be provided using an IP address of the CFP Configurator service. In addition, a CFP:Window notification can contain a max-age header.

In another example of an implementation of the invention, a response to a CFP:Window notification message may not be required.

An example CFP:Window notification message is shown, below, in Listing 1.

Listing 1.

NOTIFY*HTTP/1.1

Host: 239.255.255.250:1900

NT: ID:CFP

NTS: CFP:Window:1:1:0

USN: someuniqueid::ID: CFP

AL/Location: http://192,168.1.1:80/index,xa

Cache-Control: max-age=60

The CFP:Window data field can include three numeric values, for example, separated by colons, and can have the following format:

:CFP:Window: CFP: Version: CFP:WindowOpen:APRecentlyConfigured where:

| Description | Value |
| --- | --- |
| CFP Version | 1 to 63. |
| CFP WindowOpen | 1 if a CFP window is currently open, 0 otherwise. |
| APRecentlyConfigured | 1 if the AP was configured during the current CFP session, 0 otherwise. |

Besides the exchange of information related to security, other types of information can also be exchanged within the communication network 100 of FIG. 3. For example, client configuration information can be exchanged. For example, Quality of Service (QoS) parameters, such as Network User Priorities, can be assigned by the CFP Configurator, based on traffic information provided by the CFP Client.

A CFP Relay function allows a CFP Client device that is not on the same network segment as a CFP Configurator to be configured by the CFP Configurator, by relaying or proxying the appropriate messaging. The bridge access point 150 in FIG. 3 is an example of a device acting as a CFP Relay. Depending on the network segments, a CFP Relay function such as, for example, the bridge access point 150 can convert the format of CFP messages to an appropriate format for the other network. For example, messages received from the residential gateway 110 via the wired network A 120 can be converted to an appropriate format prior to sending the messages to the PC host 140, for example, via the wireless network C 135. Additionally, depending on the network technologies, the CFP Relay function can modify a Host or AL/Location field in a message to refer to the CFP Relay function so that the CFP Client device knows where to transmit messages locally.

When a CFP Configurator sends a CFP Window notification message, the CFP Configurator can indicate this event to all STAs, by broadcasting this information in a beacon IE or via the GENA Notify method, or can broadcast as described above. If the CFP Relay function receives a CFP Window notification message on one interface, the CFP Relay function can retransmit the message on another of its interface(s). In an example of an implementation of the present invention, the CFP Relay function can reformat the CFP Window notification message. When a CFP Client device receives a CFP Window open indication message and the CFP Client device is in a CFP Activate mode, the CFP Client device can initiate messaging to the CFP Configurator. This can be performed through a CFP Relay function, or possibly to the CFP Relay function, depending on the network technologies on either side of the CFP Relay function. Some network technologies do not involve formal association before transmission of data packets in order to proceed to an authentication or configuration phase. If a formal association is involved, the CFP Relay function and the CFP Client device can associate in order to complete the rest of the CFP messaging such as, for example, during authentication or configuration.

Multiple CFP Relay functions can be cascaded across several network technologies and segments, to connect a centralized CFP Configurator to a remote CFP Client.

The initiation of the configuration window for heterogeneous network technologies, which is described above as being performed remotely, can also be entered into via, for example, the local pushing of a button on a gateway such as, for example, the gateway 110 of FIG. 1.

The CFP approach can be described in terms of an Extensible Authentication Protocol (EAP) such as described in the document by L. Blunk and J. Vollbrecht, entitled "PPP Extensible Authentication Protocol (EAP)", published as Internet Engineering task Force (IETF) RFC 2284, March 1998 or IEEE 802.1X. The basic components for an EAP are 1) an Authentication Server, 2) an Authenticator, and 3) a Peer or Supplicant. The CFP Configurator function can act, for example within a Wi-Fi network, as the Authentication Server and Authenticator for an Extensible Authentication Protocol (EAP), and the CFP Client function can act as the Supplicant.

In another example of an implementation of the invention, where a bridge, such as, for example, the bridge access point 150 of FIG. 3 is assisting with authentication and configuration, the Authentication Server can be at the bridge access point, the CFP Configurator can act as the Authenticator, and the CFP Client can act as the Supplicant. On a heterogeneous network, the local CFP Configurator can act as the Authentication Server, the CFP Relay can act as the Authenticator, and the CFP Client can act as the Supplicant. Furthermore, a broadband access point, such as, for example, the BAP 105 of FIG. 3, can act as the Authentication Server, the CFP Relay can act as the Authenticator, and the CFP Client can act as the Supplicant. After an EAP-Success, either the service provider or the CFP Configurator or a combination of both can be able to push configuration information to the CFP Client.

In an example of an implementation of the invention, the bridge access point 150 located within the network 303a may receive configuration information from the residential gateway 110 for configuring a plurality of communication devices. The bridge access point 150 may be configured based on at least a portion of the received configuration information. The bridge access point 150 may communicate at least a portion of the received configuration information from the residential gateway 110 to the PC host 140 located within the network 303a, in response to a user input at the PC host 140. In addition, the bridge access point 150 may communicate at least a portion of the received configuration information from the residential gateway 110 to the PC host 141 located outside the network 303a, in response to a user input at the PC host 140.

The bridge access point 150 may convert data communicated between the residential gateway 110 and the PC host 140 through the bridge access point 150 from a first format to a second format. The first format may be Open Systems Interconnection (OSI) protocol layer-2 (L2) and the second format may be OSI layer-3 (L3). Alternatively, the first format may be OSI layer-3 (L3) and the second format may be OSI layer-2 (L2). The bridge access point 150 may be coupled to the residential gateway 110 via a wired connection and/or a wireless connection. The bridge access point 150 may be coupled to the PC host 140 via a wired connection and/or a wireless connection. The residential gateway 110 may receive the configuration information from a remote operator 102. The bridge access point 150 located within the network 303a may be configured based on at least a portion of the configuration information received from the remote operator 102. The bridge access point 150 may communicate at least a portion of the received configuration information from the remote operator 102 to the PC host 140 located within the network 303a, in response to the user input at the PC host 140.

Figure 4:
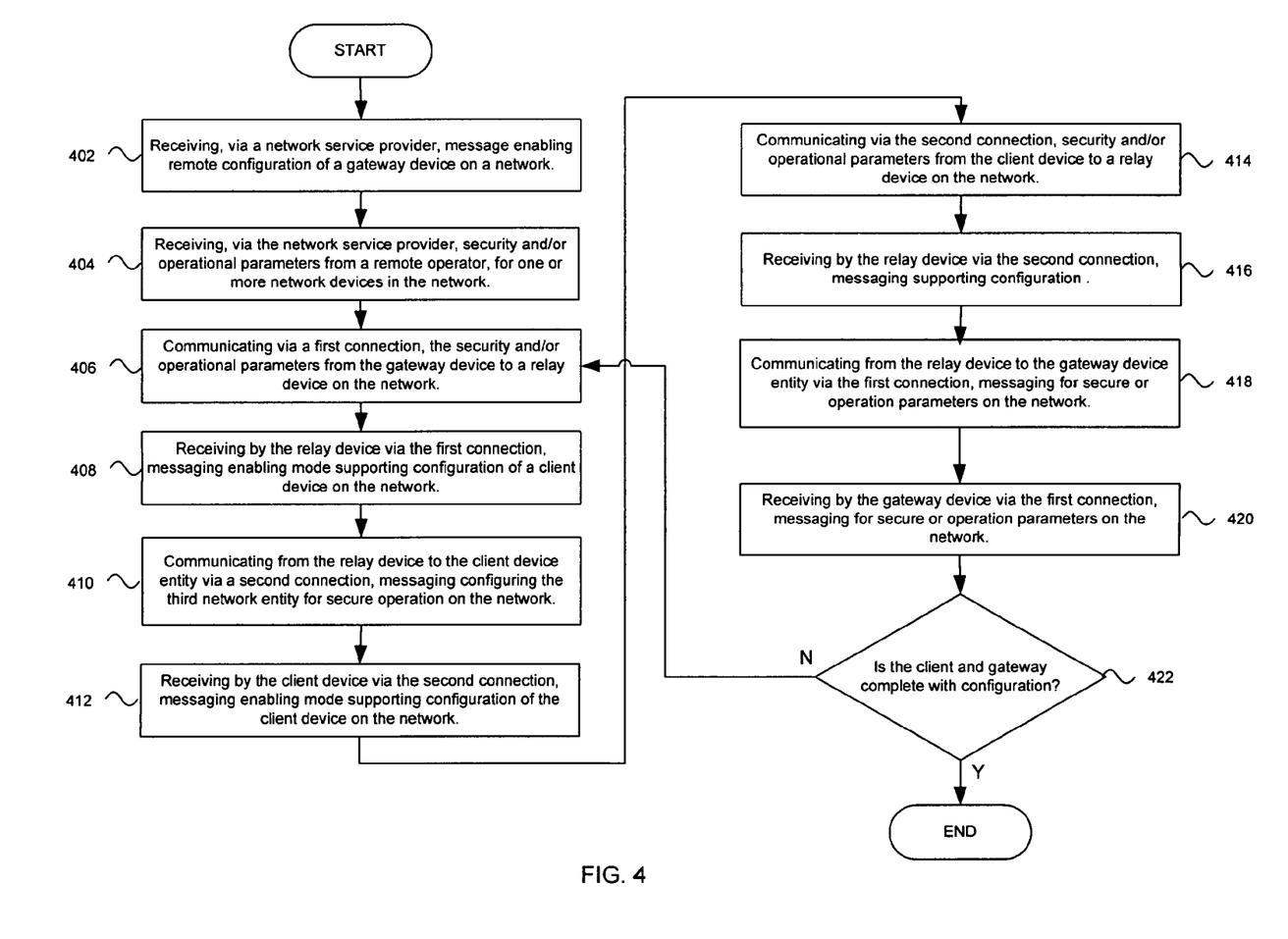
FIG. 4 is a flow diagram that shows an example of an implementation of steps for remotely configuring authentication of communication in a heterogeneous network.

FIG. 4 is a flow diagram illustrating an example of an implementation of steps for remotely configuring authentication of communication in a heterogeneous network, in accordance with an example of an implementation of the invention. Referring to FIGS. 3 and 4, at 402, a message enabling remote configuration of a gateway device 110 on the network 303a can be received via the network service provider 105. At 404, security and/or operational parameters can be received by the gateway device 110 from the remote operator 102. The received security and/or operational parameters can be for one or more network devices, such as the bridge access point 150 and the PC host 140 in the network 303*a*. At 406, the security and/or operational parameters can be communicated via a first connection, such as the wired network A 120, from the gateway device 110 to a relay device, such as the bridge access point 150, on the network 303*a*. At 408, messaging can be received by the bridge access point 150 via the first connection, such as the wired network A 120. The received messaging can enable a mode of the bridge access point 150 supporting configuration of a third network entity, such as the PC host 140 on the network 303*a*. At 410, messaging configuring the PC host 140 for secure operation on the network 303*a* can be communicated from the bridge access point 150 to the PC host 140 via a second connection, for example wireless network C 135, from the client device PC host 140 to a relay device, such as the bridge access point 150, on the network 303*a*. At 416, messaging can be received by the bridge access point 150 via the second connection, such as the wireless network C 135. At 418, security and/or operational parameters can be communicated via the first connection, such as the wired network A 120, from the relay device, such as the bridge access point 150 to the gateway device 110, on the network 303*a*. At 420, messaging can be received by the gateway device 110 via the first connection, such as the wired network A 120. At 422, if the client device such as PC host 140 and gateway device 110 are mutually configured, the process stops, otherwise the process may continue at step 406.

Although the above description refers to the configuration of a parties engaged in wired and/or wireless communication, the present invention is not limited to the particular aspects described. Variations of the examples provided above can be applied to a variety of network arrangements and technologies without departing from the spirit and scope of the present invention.

Accordingly, the present invention can be realized in hardware, software, or a combination of hardware and software. The present invention can be realized in a centralized fashion in at least one computer system, or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes can be made and equivalents can be substituted without departing from the scope of the present invention. In addition, many modifications can be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling remote configuration comprising:
receiving, at a gateway device, operational parameters from a remote source;
configuring the gateway device to operate as a configuration protocol (CFP) configurator for the operational parameters;
entering a mode for the gateway device to communicate with a relaying device via a first network, in which the relaying device also communicates with a client device via a second network and in which the second network is heterogeneous from the first network;
using the gateway device to configure the relaying device as a CFP relay; and
using the gateway device to communicate with the client device, via the relaying device, and to configure the client device as a CFP client to the gateway device operating as the CFP configurator based on the operational parameters.

2. The method of claim 1, wherein the gateway device receives operational parameters from a broadband service provider.

3. The method of claim 1, wherein the gateway device is configured to be controlled by the remote source to configure the client device.

4. The method of claim 3, wherein the remote source is a broadband service provider.

5. The method of claim 1, wherein the first network is a wireless network.

6. The method of claim 1, wherein the second network is a wireless network.

7. The method of claim 1, wherein the relaying device is an access point.

8. The method of claim 1, wherein the client device is a computer.

9. The method of claim 1, wherein the client device is a media client.

10. A method for enabling remote configuration comprising:
receiving, at a relaying device, communication from a gateway device for the relaying device to operate as a configuration protocol (CFP) relay to the gateway device operating as a CFP configurator, in which the relaying device communicates with the gateway device via a first network and in which the gateway device receives operational parameters from a remote source;
initiating, at the relaying device, communication with a client device via a second network which is heterogeneous from the first network, to bridge a link between the gateway device and the client device; and
bridging, at the relaying device, communication between the gateway device and the client device to establish the client device as a CFP client to the gateway device operating as the CFP configurator to configure the client device to operate in a secure mode to have the gateway device configure the client device.

11. The method of claim 10, wherein the remote source controls configuring of the client source by communicating operational parameters to the gateway device.

12. The method of claim 10, wherein the relaying device is an access point.

13. The method of claim 10, wherein the remote source is a broadband service provider.

14. The method of claim 10 wherein the gateway is a residential gateway.

15. The method of claim 10, wherein at least one of the first and second networks is a wireless network.

16. An apparatus for enabling remote configuration comprising:
- a gateway device to:
  - receive operational parameters from a remote source to configure the gateway device to operate as a configuration protocol (CFP) configurator for the operational parameters;
  - enter a mode to communicate with a relaying device via a first network, in which the relaying device also communicates with a client device via a second network and in which the second network is heterogeneous from the first network;
  - configure the relaying device as a CFP relay; and
  - communicate in a secure mode with the client device, via the relaying device, to configure the client device as a CFP client to the CFP configurator of the gateway device based on the operational parameters.

17. The apparatus of claim 16, wherein the gateway device receives operational parameters from a broadband service provider.

18. The apparatus of claim 16, wherein the gateway device receives operational parameters from a broadband service provider and is configured to be controlled by the remote source for the remote source to configure the client device.

19. The apparatus of claim 16, wherein the apparatus is a residential gateway.

20. The apparatus of claim 16, wherein the relaying device is an access point.

* * * * *